US009516542B2

(12) United States Patent
Huang et al.

(10) Patent No.: US 9,516,542 B2
(45) Date of Patent: Dec. 6, 2016

(54) WIRELESS DEVICE, METHOD, AND COMPUTER READABLE MEDIA FOR CHANNEL CONTENTION IN WIRELESS COMMUNICATION DEVICES

(71) Applicant: Intel Corporation, Santa Clara, CA (US)

(72) Inventors: Po-Kai Huang, West Lafayette, IN (US); Qinghua Li, San Ramon, CA (US); Rongzhen Yang, Shanghai (CN); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 14/494,139

(22) Filed: Sep. 23, 2014

(65) Prior Publication Data
US 2016/0088513 A1 Mar. 24, 2016

(51) Int. Cl.
 *H04W 74/08* (2009.01)
 *H04W 28/02* (2009.01)
 (Continued)

(52) U.S. Cl.
 CPC ....... *H04W 28/0273* (2013.01); *H04B 7/0413* (2013.01); *H04W 28/0268* (2013.01);
 (Continued)

(58) Field of Classification Search
 CPC ...... H04W 74/0808; H04W 74/0816–74/0825; H04W 28/0268; H04L 12/413–12/4135
 See application file for complete search history.

(56) References Cited

U.S. PATENT DOCUMENTS

2007/0060155 A1  3/2007 Kahana et al.
2007/0286122 A1* 12/2007 Fonseca ............... H04L 1/0021
  370/329
(Continued)

FOREIGN PATENT DOCUMENTS

TW   201613384 A   4/2016
WO   WO-2013049826 A1   4/2013
(Continued)

OTHER PUBLICATIONS

Fuemmeler et al., Selecting Transmit Powers and Carrier Sense Thresholds for CSMA Protocols, Technical Report, Oct. 2004, 18 pages.*

(Continued)

*Primary Examiner* — Hoon J Chung
(74) *Attorney, Agent, or Firm* — Schwegman Lundberg & Woessner, P.A.

(57) ABSTRACT

Wireless device, method, and computer readable media for channel contention in wireless communication devices. The wireless communication device may include hardware processing circuitry configured to: determine to adapt the channel contention, and configured to adapt the channel contention settings by changing a level of a clear channel assessment (CCA) and adapting at least one additional channel contention setting. The hardware processing circuitry may be configured to adapt the channel contention settings by raising a level of the clear channel assessment (CCA) and by decreasing a power used to transmit, raising a back-off time, or modifying a portion of or parameter to a distributed coordination function (DCF). The hardware processing circuitry may be configured to adapt the channel contention settings by decreasing the clear channel assessment (CCA) and increasing a power used to transmit or (Continued)

decreasing an amount of time to wait after a CCA determines the channel is free.

19 Claims, 7 Drawing Sheets

(51) Int. Cl.
 *H04W 52/24* (2009.01)
 *H04B 7/04* (2006.01)
 *H04W 74/02* (2009.01)
(52) U.S. Cl.
 CPC ..... *H04W 52/248* (2013.01); *H04W 74/0808* (2013.01); *H04W 74/0816* (2013.01); *H04W 74/02* (2013.01)

(56) References Cited

U.S. PATENT DOCUMENTS

2015/0296528 A1* 10/2015 Coffey ............ H04W 74/0808
 370/338
2016/0014807 A1* 1/2016 Ghosh ................ H04L 5/0048
 370/329

FOREIGN PATENT DOCUMENTS

WO WO-2014071308 A1 5/2014
WO WO-2016048505 A1 3/2016

OTHER PUBLICATIONS

Chen et al., Scheduled Mesh Access Mechanism for an IEEE 802.11 Mesh Network, 2008, IEEE, p. 1734-1739.*
"802.11ax Spec Development Process Proposal", IEEE Standards Association, (Jul. 14, 2014).
International Application Serial No. PCT/US2015/046225, International Search Report mailed Dec. 3, 2015, 3 pgs.
International Application Serial No. PCT/US2015/046225, Written Opinion mailed Dec. 3, 2015, 7 pgs.
"Taiwanese Application Serial No. 104125966, Office Action mailed Jul. 26, 2016", W/ English Report, 8 pgs.
Veli-Pekka, Ketonen, "IEEE802.11ax-High Efficiency WLAN (HEW) Standardization and Potential Technologies", The Wi-Fi Performance Company, (Jun. 3, 2014).

* cited by examiner ically, the AP 102, HEW device 104, and/or legacy device 106 may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

WIRELESS DEVICE, METHOD, AND COMPUTER READABLE MEDIA FOR CHANNEL CONTENTION IN WIRELESS COMMUNICATION DEVICES

TECHNICAL FIELD

Embodiments pertain to wireless communications. Some embodiments relate to adapting channel contention, and, in some embodiments, to adapting channel contention by changing clear channel assessment in conjunction with at least one other channel contention setting.

BACKGROUND

One issue with communicating data over a wireless network is throughput and delay time. The wireless devices contend for the wireless medium, which affects the throughput and delay time of the packets of the wireless devices. Another issue with communicating over a wireless network is that often more than one standard may be in use in a wireless local-area network (WLAN). For example, IEEE 802.11ax, referred to as High Efficiency wireless local-area networks (WLAN) (HEW), is a successor to IEEE 802.11ac standard for wireless local-area networks (WLANs). The Wi-Fi standards have evolved from IEEE 802.11b to IEEE 802.11g/a to IEEE 802.11n to IEEE 802.11ac and now to IEEE 802.11ax. In each evolution of these standards, there were mechanisms to afford coexistence with the previous standard. For HEW, the same requirement exists for coexistence with these legacy standards regarding channel contention.

Thus there are general needs for systems and methods that determine settings for channel contention in wireless networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
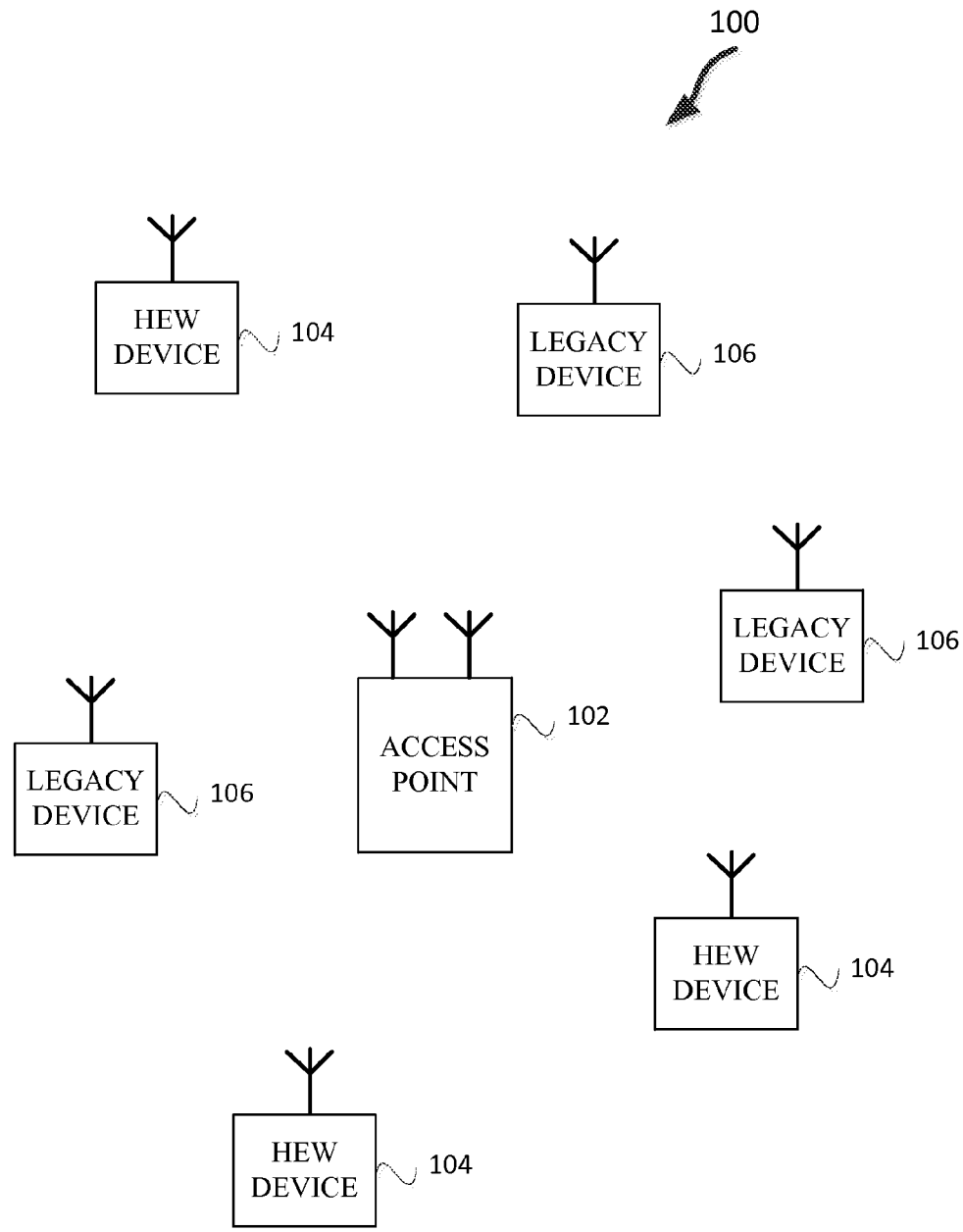
FIG. 1 illustrates a wireless network in accordance with some embodiments.

FIG. 1 illustrates a wireless network in accordance with some embodiments. The wireless network may comprise a basic service set (BSS) 100 that may include an access point (AP) 102, a plurality of HEW devices 104 and a plurality of legacy devices 106.

The AP 102 may be an access point (AP) using the Institute of Electrical and Electronics Engineers (IEEE) 802.11 to transmit and receive. The AP 102 may be a base station. The AP 102 may use other communications protocols as well as the 802.11 protocol. For example the AP 102 may use DensiFi or 802.16. The 802.11 protocol may be 802.11ax. The 802.11 protocol may include using Orthogonal Frequency-Division Multiple Access (OFDMA). The 802.11 may include using multi-user (MU) multiple-input and multiple-output (MIMO)(MU-MIMO). The HEW devices 104 may operate in accordance with 802.11ax and/or DensiFi. The legacy devices 106 may operate in accordance in accordance with one or more of 802.11 a/g/ag/n/ac, or another legacy wireless communication standard.

The HEW devices 104 may be wireless transmit and receive devices such as cellular telephone, handheld wireless device, wireless glasses, wireless watch, wireless personal device, tablet, or another device that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In some embodiments, a 320 MHz contiguous bandwidth may be used. In some embodiments, bandwidths of 1 MHz, 1.25 MHz, 2.5 MHz, 5 MHz and 10 MHz or a combination thereof may also be used. In these embodiments, an HEW frame may be configured for transmitting a number of spatial streams.

In other embodiments, the AP 102, HEW device 104, and/or legacy device 106 may implement different technologies such as CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)).

In an OFDMA system such as 802.11ax, an associated HEW device 104 may operate on any 20 MHz sub-channel of the BSS 100 (that can operate for example at 80 MHz).

In example embodiments, an AP 102, HEW devices 104, and legacy devices 106 use carrier sense multiple access/collision avoidance (CSMA/CA). In some embodiments, the media access control (MAC) layer 706 (see FIG. 7) controls access to the wireless media.

In example embodiments, an AP 102, HEW devices 104, legacy devices 106, perform carrier sensing and can detect whether or not the channel is free. For example, an AP 102, HEW device 104, or legacy device 106 may use clear channel assessment (CCA) which may include a determination whether or not the channel is clear based on a Decibel-milliwatts (dBm) level of reception. In example embodiments, the physical layer (PHY) 704 is configured to determine a CCA for an AP 102, HEW devices 104, and legacy devices 106.

After determining that the channel is free, an AP 102, HEW device 104, and legacy devices 106 defer their attempt to access the channel a back-off time to avoid collisions. In example embodiments, an AP 102, HEW device 104, and legacy devices 106 determine the back-off time by first waiting a specific amount of time and then adding a random back-off time, which, in some embodiments, is chosen uniformly between 0 and a current contention window (CS) size.

In example embodiments, an AP 102, HEW devices 104, legacy devices 106, access the channel in different ways. For example, in accordance with some IEEE 802.11ax (High-Efficiency Wi-Fi (HEW)) embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 104 in accordance with a non-contention based multiple access technique. This is unlike conventional Wi-Fi communications in which legacy devices 106 and, optionally, HEW devices 104 communicate in accordance with a contention-based communication technique, rather than a non-contention multiple access technique. During the HEW control period, the AP 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique or uplink multiuser MIMO (UL MU-MMIO).

The AP 102 may also communicate with legacy devices 106 in accordance with legacy IEEE 802.11 communication techniques. In some embodiments, the master station may also be configurable communicate with HEW stations outside the HEW control period in accordance with legacy IEEE 802.11 communication techniques, although this is not a requirement.

In example embodiments, the AP 102 is configured to perform one or more of the functions and/or methods described herein such as determining whether or not to adapt the channel contention settings, select new a CCA value and at least one additional new setting, transmit an indication to change a CCA threshold, and transmit a new CCA value and at least one additional new setting to a HEW device 106. In example embodiments, the HEW device 104 are configured to perform one or more of the functions and/or methods described herein such as determining whether or not to adapt the channel contention settings, adapt the channel contention settings, select new a CCA value and at least one additional new setting, and receive a new CCA value and at least one additional new setting from an AP 102. In some embodiments, the AP 102 may send an indication that the CCA value should be raised or lowered in conjunction with changing at least one additional setting.

Figure 2:
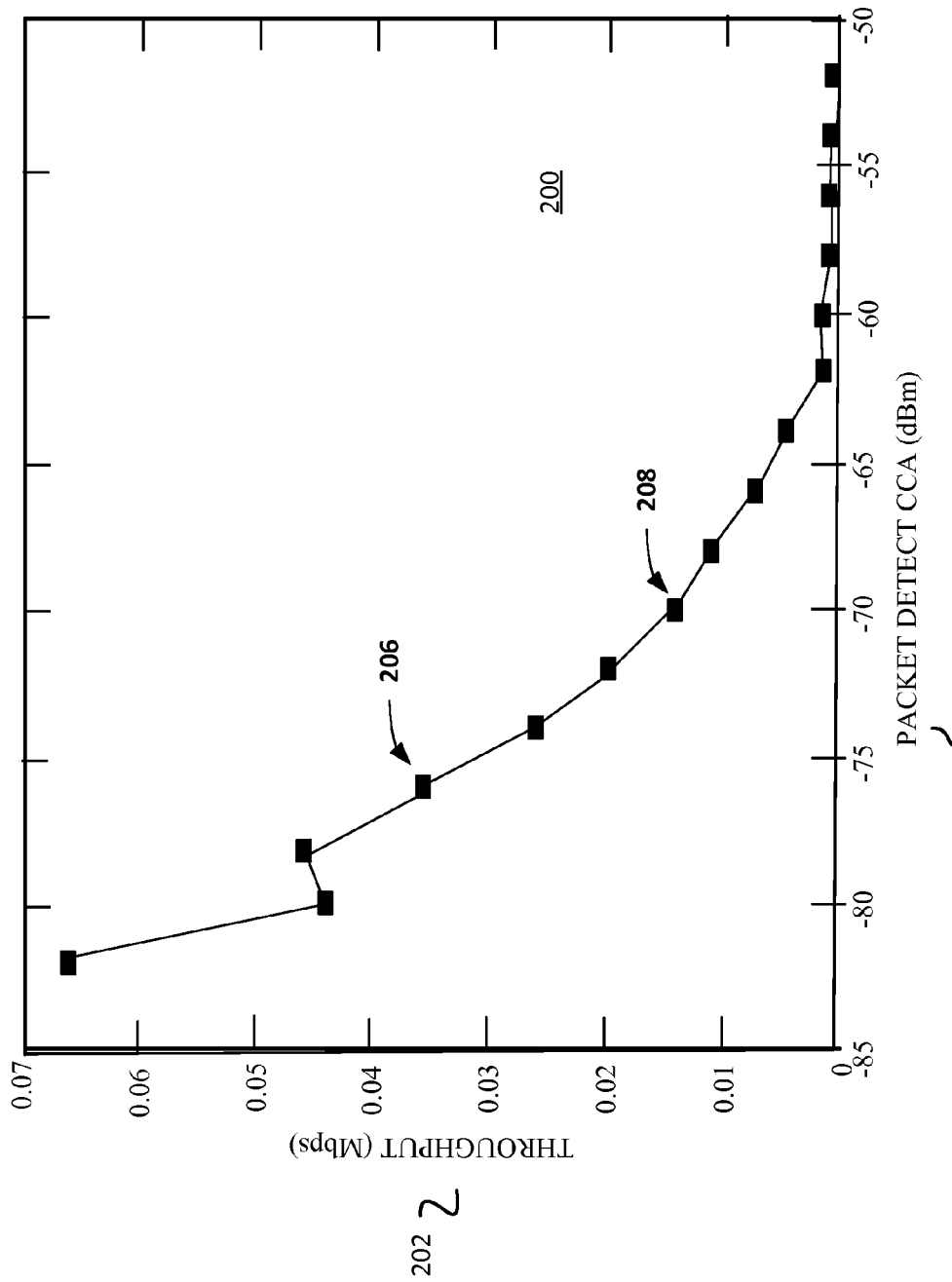
FIG. 2 illustrates a chart of throughput of legacy devices as clear channel assessment is raised in HEW devices, according to example embodiments.

FIG. 2 illustrates a chart 200 of throughput of legacy devices 106 as clear channel assessment is raised in HEW devices 104, according to example embodiments. Illustrated in FIG. 2 are throughput 202 in megabits per second (Mbps) along the vertical axis, and Packet Detect CCA 204 used by HEW devices in Decibel-milliwatts (dBm) along the horizontal axis. The Packet Detect CCA 204 is a second threshold that is used after a preamble is detected in order to determine whether or not a packet is detected. The throughput 202 may be an average throughput of the worst 5% devices in the BSS 100 (see FIG. 1). In example embodiments, the worst 5% devices are the wireless communication devices whose average throughputs are within the lowest 5% among all wireless communication devices in the BSS 100. The majority of the worst 5% devices may be legacy devices 106 since the HEW devices 104 are more aggressive in grabbing the channel.

In example embodiments, the HEW devices 104 use two CCA thresholds. In example embodiments, if the preamble of a packet is detected by the HEW device 104, then a lower threshold e.g. the legacy −82 dBm is used by the HEW device 104. In example embodiments, if the preamble of a packet is not detected, a higher threshold e.g. the legacy threshold value of −62 dBm is used by the HEW device 104. If the received signal power is above the threshold, the HEW device 104 determines that the channel is busy.

In example embodiments, the HEW device 104 is configured to raise the threshold of the packet detection in CCA 204. For example, at 206 the throughput of the worst 5% devices is approximately 0.033 Mbps and the Packet Detect CCA 204 for packet detection is −75 dBm. In example embodiments, the HEW device 104 may raise the Packet Detect CCA 204 for packet detection to −70 dBm. In example embodiments, raising the Packet Detect CCA 204 means that the channel is considered busy by the HEW device 104 only if the received signal power is above −70 dBm instead of −75 dBm. In example embodiments, raising the CCA threshold has the technical effect that the HEW device 104 is less sensitive at detecting packets on the channel and will tend to ignore the on-going transmission from neighboring devices. As a result of the HEW device 104 raising the Packet Detect CCA 204 from −75 to −70 dBm at 208 the throughput of the worst 5% device is reduced from 0.033 to 0.012 Mbps. This may be because the HEW devices 104 reserve the channel before the legacy device 106.

Figure 3:
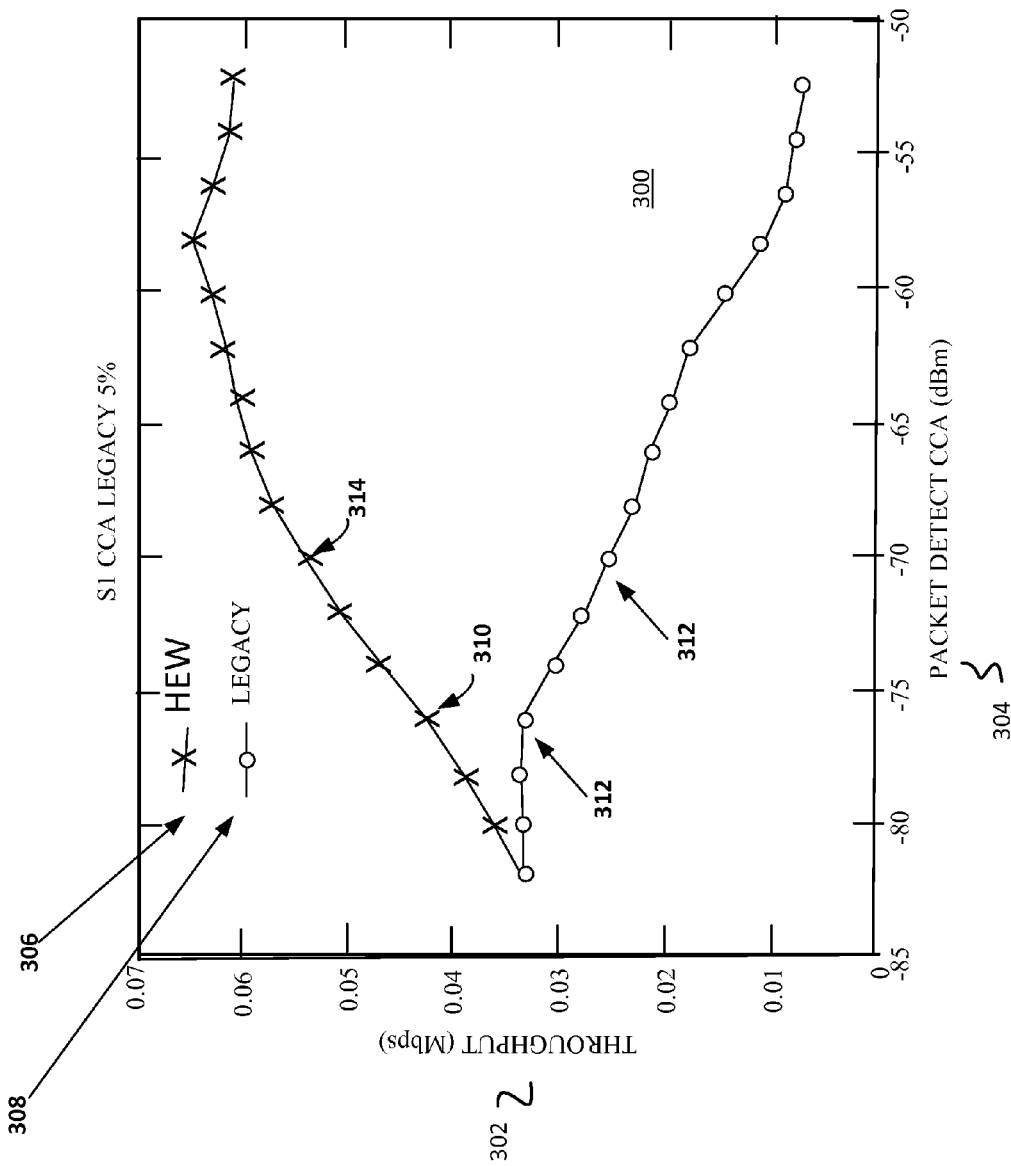
FIG. 3 illustrates a chart of throughput of legacy devices and HEW devices 104 as clear channel assessment is raised in HEW devices, according to example embodiments.

FIG. 3 illustrates a chart 300 of average throughput of legacy devices 106 and HEW devices 104 as clear channel assessment threshold is raised in HEW devices 104, according to example embodiments. Illustrated in FIG. 3 are throughput 302 in megabits per second (Mbps) along the vertical axis, and the CCA threshold for packet detection 304 in Decibel-milliwatts (dBm) along the horizontal axis. The throughput 302 may be an average throughput of the legacy devices 106 in the BSS 100 (see FIG. 1). The line 306 represents the average throughput for HEW devices 104 according to example embodiments, and the line 308 represents the average throughput of legacy devices 106.

In example embodiments, the HEW device 104 is configured to raise the Packet for packet detection 304. For example, at 310 the HEW device 104 has the CCA threshold set at −75 dBm. The average throughput of the HEW devices 104 is 28 Mbps and the average throughput of the legacy devices 106 is 2 Mbps.

The Hew device 104 at 314 raises the CCA threshold to −70 dBm, which raises the average throughput 302 to 3.3 Mbps, but the legacy device 106 average throughput 302 is lowered to approximately 1.5 M bps. Thus, in some example embodiments, the HEW device 104 can improve the average throughput 302 of the HEW devices 104 by increasing the CCA threshold 304, but the throughput 302 of the legacy devices 106 decreases as the HEW devices 104 raise the CCA threshold 304. The legacy device 106 may have a reduced average throughput 302 because the HEW devices 104 may transmit on the channel before the legacy devices 106. The legacy devices 106 may determine the channel as being busy longer than the HEW devices 104 because the legacy devices 106 have a lower CCA threshold 304.

Figure 4:
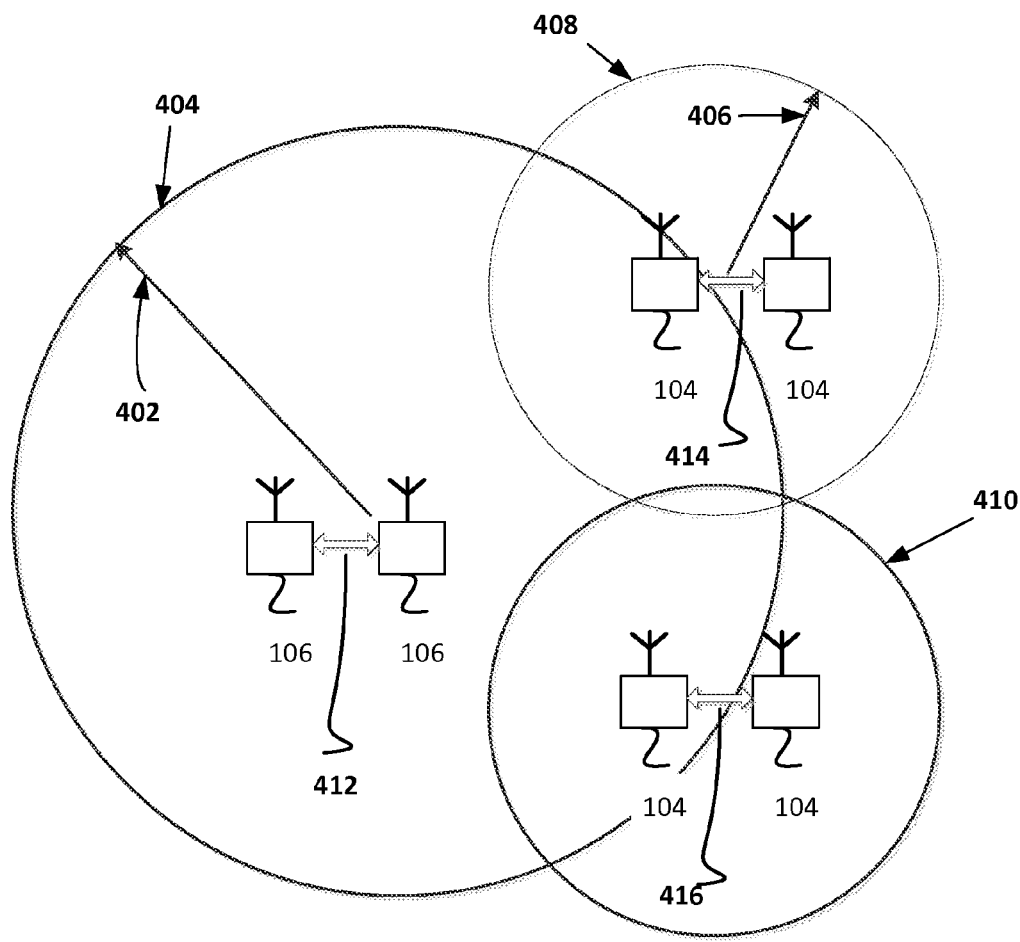
FIG. 4 illustrates HEW devices and legacy devices in a BSS where the HEW devices have a raised CCA level, according to some example embodiments.

FIG. 4 illustrates HEW devices 104 and legacy devices 106 in a BSS 100 (see FIG. 1) where the HEW devices 104 have a raised CCA threshold or level, according to some example embodiments. Illustrated in FIG. 4 is a sensitivity circle 404 for legacy devices 106 and sensitivity circles 408, 410 for HEW devices 104. The legacy devices 106 are transmitting 412 and the HEW devices 104 are transmitting 414, 416. The diameter 402 illustrates the sensitivity range where another transmitter may register as a busy channel with a legacy device 106 CCA setting. For example, since two HEW devices 104 are within the sensitivity circle 404, the transmissions from the HEW devices 104 may be registered by the legacy devices 106 as a busy channel. The diameter 406 illustrates the sensitivity range where another transmitter may register as a busy channel with the HEW device 104 CCA setting according to an example embodiment.

For example, the legacy devices 106 are not within the sensitivity circles 408, 410 so the HEW devices 104 will not defer transmitting because of transmissions 412 of the legacy devices 106. Because the HEW devices 104 have a CCA threshold that is raised, the sensitivity circles 408, 410 for the HEW devices 104 is smaller than the sensitivity circles 404 for the legacy devices 106. The smaller sensitivity circles 408, 410 may enable the HEW devices 104 to have a higher average throughput and/or latency compared with the legacy devices 106. The larger sensitivity circle 404 of the legacy devices 106 may make it difficult for the legacy devices 106 to contend for a channel because they will register the HEW devices 104 transmissions 414, 416 as a busy channel.

Figure 5:
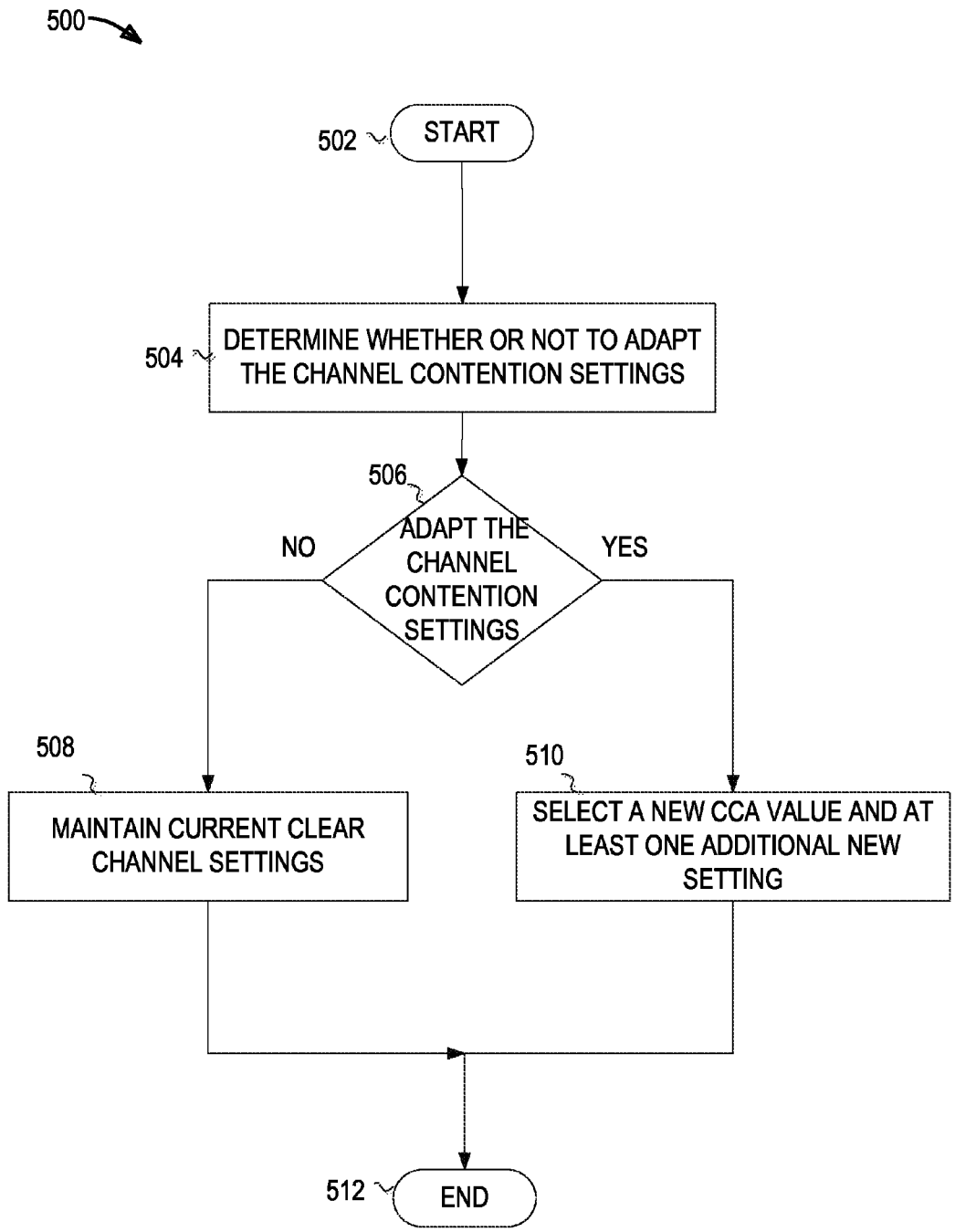
FIG. 5 illustrates a method for adapting channel contention on a HEW device according to example embodiments.

FIG. 5 illustrates a method for adapting channel contention on a HEW device according to example embodiments. The method 500 begins at 502 with start. The method 500 continues at 504 with determining whether or not to adapt the channel contention settings. For example the MAC layer 706 (see FIG. 7) may be configured to determine whether or not to adapt the channel contention settings. The MAC layer 706 may determine that a particular setting such as a raised CCA and longer contention window or lower power transmitting power would be more appropriate. For example the MAC layer 706 may determine that the HEW device 104 is downloading files and select settings that increase the average throughput. In another example, the MAC layer 706 may determine that applications are being used on the HEW device 104 such as interactive gaming. The MAC layer 706 may select channel contention settings that may have better performance e.g. shorter latency for interactive gaming.

In example embodiments, the MAC layer 706 is configured to measure throughput and delay and determine to adapt the channel contention settings based on the measurements. In example embodiments, the HEW device 104 may receive a packet indicating that the HEW device 104 should change its channel contention settings. In example embodiments, the packet includes an indication of how the HEW device 104 should change its channel contention settings. In an example, the packet includes an indication of whether to raise or lower the CCA value, and an indication of one other channel contention setting to change. In example embodiments, the HEW device 104 receives a packet transmitted as disclosed in FIG. 6. The method 500 continues at 506 with adapt the channel contention settings. If it was determined not to adapt the channel contention settings, then the method continues at 508 with maintaining current clear channel settings. The method 500 then ends at 512. If it was determined to adapt the channel contention settings, then the method 500 continues at 510 with selecting a new CCA value and at least one additional new setting. For example, the CCA value may be raised and one or more other channel setting may be adapted. The other clear channel settings that may be adapted include increasing the size of contention window, lowering the transmission power, increasing the size of backoff timer such as by adding two time slots, or doubling the contention window size, or modifying another portion of the DCF.

In example embodiments, the at least one additional channel contention setting is adapted to make it more difficult for the wireless communication device to access the channel if the level of the CCA is raised, and make it easier for the wireless communication device to access the channel if the level of the CCA is lowered. For example, if the level of the CCA is raised, then contention window size is raised, and if the level of the CCA is lowered, then the contention window size is lowered. As another example, if the level of the CCA is raised, then transmission power is lowered, and if the level of the CCA is lowered, then the transmission power is raised. In example embodiments, the settings do not have to be the same setting for lowering and raising the CCA. For example, if the level of the CCA is raised, then transmission power is lowered, and if the level of the CCA is lowered, then the contention window is lowered.

In example embodiments, the CCA value may be lowered and one or more channel settings may be adapted. The other clear channel settings that may be adapted include decreasing the size of contention window, raising the transmission power, decreasing the size of backoff timer such as by removing two time slots, reducing the contention window size by half, or modifying another portion of the DCF. The method 500 may end at 512.

Example embodiments have the technical effect of greater throughput for a BSS 100 by permitting the HEW devices 104 to adapt the channel contention settings by raising the CCA threshold in conjunction with adapting at least one or more other channel contention settings such as power or contention window size.

Figure 6:
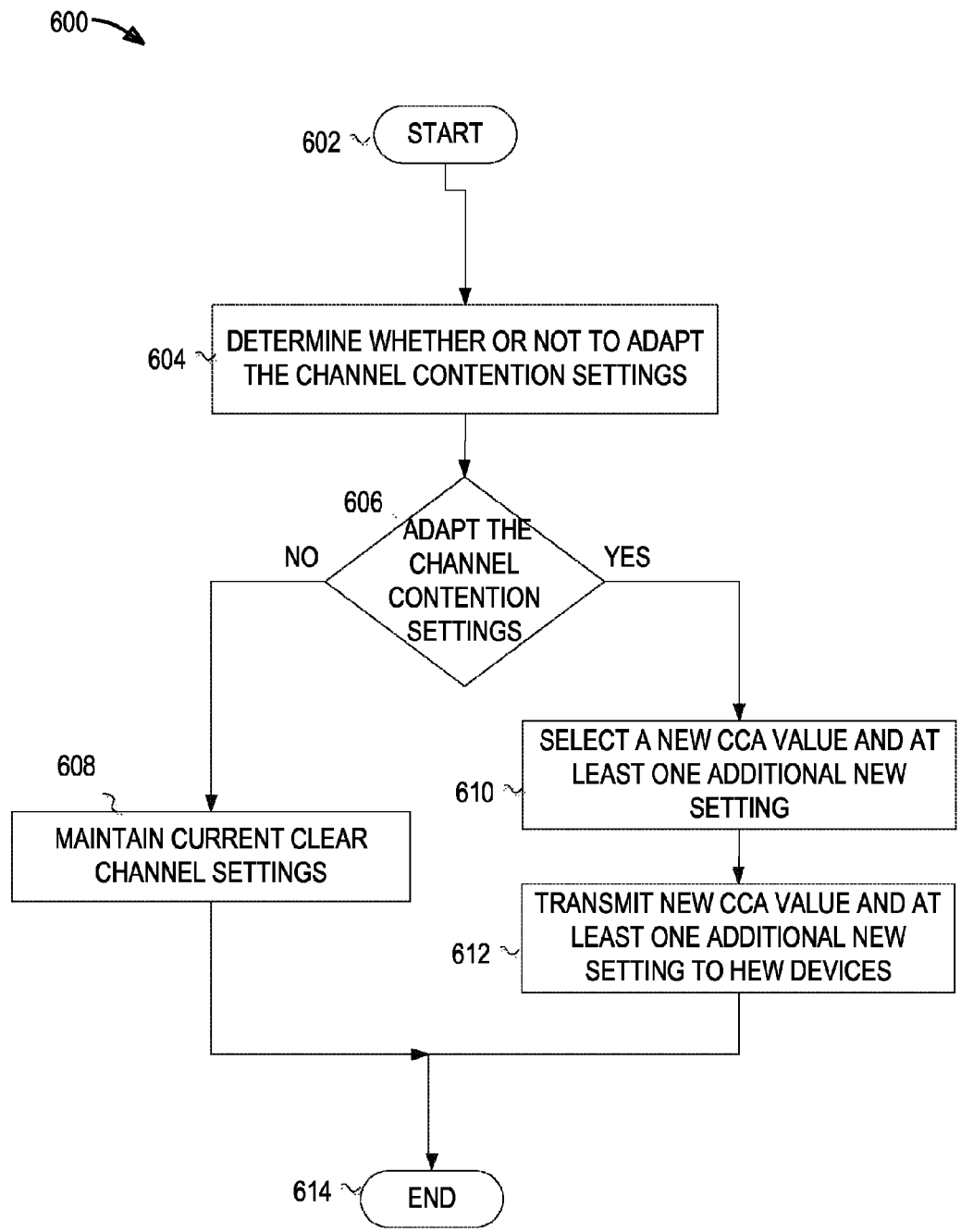
FIG. 6 illustrates a method for adapting channel contention on an access point according to example embodiments.

FIG. 6 illustrates a method 600 for adapting channel contention on an access point 102 according to example embodiments. The method 600 may begin at start 602. The method 600 may continue at 604 with determining whether or not to adapt the channel contention settings. For example, an access point 102 may determine throughput and delay averages for the HEW devices 104 and legacy devices 106. In example embodiments, the access point 102 determines that some HEW devices 104 or legacy device 106 have too low a throughput average or that a delay is too slow in some devices. In other embodiments, the access point 102 may determine that average throughput or delay time may be increased by adapting the channel contention settings. In example embodiments, the access point 102 receives communication reports from the HEW devices 104 and/or the legacy devices 106 and bases the determination of whether or not to adapt the channel contention settings based on the received communication reports. In example embodiments, the AP 102 sends a request for the communication reports. In example embodiments, the AP 102 determines to adapt the channel contention if a throughput or latency of a legacy device 106 is determined to be below a predetermined level. The AP 102 may, for example, determine that at least one legacy device 106 has a throughput or latency time below a certain level and based on this send a packet to the HEW devices 104 to lower their CCA value.

The method 600 continues at 606 with adapt the channel contention settings. If the channel contentions settings are not to be adapted, then the method 600 continues at 608 with maintaining the current clear channel settings. The method 600 ends at 614. If the channel contentions settings are to be adapted, then the method 600 continues at 610 with selecting a new CCA value and at least one additional new setting. For example, the access point 102 may select a new CCA setting and at least one other CCA setting to change. The access point 102 may select new settings for one or more of the devices communicating with the access point 102. For example, the access point 102 may select the HEW devices 104 for adapting the CCA settings or some portion of the HEW devices 104. In some embodiments, the access point 102 selects both the HEW devices 104 and the legacy devices 106 for new CCA settings. The AP 102 determines whether to raise or lower the CCA. The AP 102 selects at least one additional setting to adapt the channel contention settings. The additional setting may be the power transmission level that changes the interference footprint of the HEW device or a setting that affects the amount of time the HEW device 104 and/or legacy device 106 waits after determining that the channel is clear using the CCA before transmitting on the channel.

In some embodiments, the AP 102 may send an indication that the CCA value should be raised or lowered in conjunction with changing at least one additional setting. For example, a HEW device 104 may have a table of options for adapting the channel contention settings and the CCA level. The AP 102 may send an indication that the HEW device 104 should raise the CCA level and the HEW device 104 may then make a selection from the table.

The method 600 continues at 612 with transmitting new CCA values and at least one additional new CCA settings. For example, the AP 102 may broadcast new settings to the HEW devices 104 and/or the legacy devices 106. In other embodiments, the AP 102 may unicast new settings to the HEW devices 104 and/or legacy devices 106. In example embodiments, the AP 102 may send an indication for the HEW device 104 to lower or raise the CCA threshold. The method 600 may end at 614.

Figure 7:
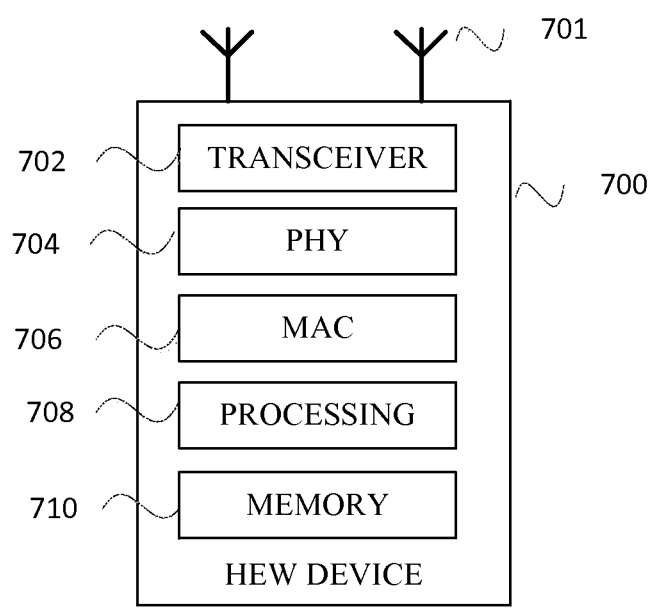
FIG. 7 illustrates a HEW device in accordance with some embodiments.

FIG. 7 illustrates a HEW device in accordance with some embodiments. HEW device 700 may be an HEW compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 700 may be suitable for operating as access point 102 (FIG. 1) or an HEW device 104 (FIG. 1). In accordance with embodiments, HEW device 700 may include, among other things, a transmit/receive element (for example an antenna), a transceiver 702, physical layer (PHY) circuitry 704 and medium-access control layer circuitry (MAC) 706. PHY 704 and MAC 706 may be HEW compliant layers and may also be compliant with one or more legacy IEEE 802.11 standards. MAC 706 may be arranged to configure PPDUs and arranged to transmit and receive PPDUs, among other things. HEW device 700 may also include other hardware processing circuitry 708 and memory 710 configured to perform the various operations described herein. The processing circuitry 708 may be coupled to the transceiver 702, which may be coupled to the transmit/receive element 701. While FIG. 7 depicts the processing circuitry 708 and the transceiver 702 as separate components, the processing circuitry 708 and the transceiver 702 may be integrated together in an electronic package or chip.

In some embodiments, the MAC 706 may be arranged to contend for a wireless medium during a contention period to receive control of the medium for the HEW control period and configure an HEW PPDU. In some embodiments, the MAC 706 may be arranged to contend for the wireless medium based on channel contention settings, a transmitting power level, and a CCA level.

The PHY 704 may be arranged to transmit the HEW PPDU. The PHY 704 may include circuitry for modulation/demodulation, upconversion/downconversion, filtering, amplification, etc. In some embodiments, the hardware processing circuitry 708 may include one or more processors. The hardware processing circuitry 708 may be configured to perform functions based on instructions being stored in a RAM or ROM, or based on special purpose circuitry. In some embodiments, the hardware processing circuitry 708 may be configured to perform one or more of the functions described herein determining whether or not to adapt the channel contention settings, selecting a new CCA value and at least one additional new setting, and determining to send a communications report.

In some embodiments, two or more antennas may be coupled to the PHY 704 and arranged for sending and receiving signals including transmission of the HEW packets. The HEW device 700 may include a transceiver to transmit and receive data such as HEW PPDU and packets that include an indication that the HEW device 700 should adapt the channel contention settings according to settings included in the packet. The memory 710 may be store information for configuring the other circuitry to perform operations for configuring and transmitting HEW packets and performing the various operations described herein including adapting the channel contention settings, CCA level, and transmit power, as well as determining whether or not to adapt the channel contention settings.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, although the scope of the invention is not limited in this respect as they may also be suitable to transmit and/or receive communications in accordance with other techniques and standards. In some embodiments, the HEW device 700 may use 4× symbol duration of 802.11n or 802.11ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In example embodiments, in simulations, setting the CCA value to −82 dBm and lowering the power transmission provide good experimental results by increasing the throughput of HEW devices 104 without affecting the legacy devices 106. Moreover, by lowering the transmission power the technical effect of permitting more APs to operate within a given geographical area is provided without significantly lowering the throughput of the HEW devices 104 and legacy devices 106.

Example embodiments provide the technical effect of providing a technical incentive for HEW devices 104 to lower their transmission power by permitting the HEW device 104 to raise the CCA value in return for lowering the transmission power or another channel access setting. In example embodiments this provides the technical advantage of permitting HEW devices 104 to adjust their own CCA values without disrupting the BSS 100 and without control by the AP 102.

Example embodiments have the technical effect of increasing access to the wireless medium for legacy devices 106 by adjusting HEW devices 104 to lower transmission power in conjunction with raising the level of the CCA. For example, referring to FIG. 4, the HEW devices 104 may lower the CCA which would make the diameter 406 of the sensitivity range smaller. But, by having the HEW device 104 also decrease the transmit power, the legacy devices 106 (and other HEW devices 104) would not be able to detect the HEW devices 104 from as far out. This would effectively be like making the diameter 402 smaller. Thus, in some example embodiments, HEW devices 104 may determine to increase the level of the CCA and at the same time have to decrease the transmit power. The HEW device 104 thus, may increase both the throughput of the HEW device 104, and the throughput of other HEW devices 104 and/or legacy devices 106.

Example embodiments have the technical effect of increasing an overall throughput. For example, in example embodiments, the HEW device 104 may make distributed determinations on channel contention. The HEW device 104 may have the option of raising the level of the CCA only in conjunction with lower the power of transmission. The HEW device 104 may increase its own throughput by raising the level of the CCA and may increase the overall throughput by decreasing the transmission power.

Example embodiments have the technical effect of increasing access to the wireless medium for legacy devices 106 by adjusting HEW devices 104 to lower transmission power in conjunction with raising the level of the CCA. For example, referring to FIG. 4, the HEW devices 104 may lower the CCA which would make the diameter 406 of the sensitivity range smaller. But, by having the HEW device 104 also adapt an additional channel contention setting, the legacy devices 106 (and other HEW devices 104) may have better access to the channel than they did prior to the HEW device 104 adapting its channel contention settings. Thus, in some example embodiments, HEW devices 104 may determine to increase the level of the CCA and at the same time have to decrease the transmit power. The HEW device 104 thus, may increase both the throughput of the HEW device 104, but also of other HEW devices 104 and/or legacy devices 106.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The following examples pertain to further embodiments. Example 1 is a wireless communication device for adapting channel contention settings. The wireless communication device includes hardware processing circuitry configured to: determine whether to adapt channel contention settings, and in response to a determination to adapt the channel contention settings, adapt the channel contention settings to change a level of a clear channel assessment (CCA) and adapt at least one additional channel contention setting.

In Example 2, the subject matter of Example 1 can optionally include where the hardware processing circuitry is further configured to raise the level of the CCA only in conjunction with a change to at least one additional channel contention setting that makes it more difficult to contend for the channel, unless the wireless communication device received an indication from a management packet to raise the level of the CCA.

In Example 3, the subject matter of Examples 1 and 2 can optionally include where the hardware processing circuitry is further configured to: access a wireless medium using the changed CCA and the at least one additional channel contention setting; and transmit on the wireless medium a packet.

In Example 4, the subject matter of Examples 1 through 3 can optionally include where the hardware processing circuitry is further configured to: receive a packet indicating the wireless communication device should adapt its channel contention settings to change the level of the CCA and adapt at least one additional channel contention setting; and change the level of the CCA and at least one additional channel contention setting according to the received packet.

In Example 5, the subject matter of Examples 1 through 3 can optionally include where the hardware processing circuitry is further configure to: adapt the channel contention settings to raise the level of the CCA and perform at least one from the following group: decrease a power used to transmit, raise a back-off time by adding 1 or more time slots to the back off time, and modify another portion of a distributed coordination function (DCF).

In Example 6, the subject matter of Examples 1 through 3 can optionally include where the hardware processing circuitry is further configure to: adapt the channel contention settings to decrease a level of the clear channel assessment (CCA) and perform at least one from the following group: increase a power used to transmit or decrease an amount of time to wait after a CCA determines a channel is free.

In Example 7, the subject matter of Examples 1 through 3 can optionally include where the hardware processing circuitry is further configure to: adapt the channel contention settings to increase a level of the clear channel assessment (CCA) to approximately −82 dBm and decrease a power used to transmit.

In Example 8, the subject matter of Examples 1 through 3 can optionally include where the hardware processing circuitry is further configure to: adapt the at least one additional channel contention setting by adapting the at least one additional channel contention setting to make it more difficult for the wireless communication device to access the channel if the level of the CCA is raised, or make it easier for the wireless communication device to access the channel if the level of the CCA is lowered.

In Example 9, the subject matter of Examples 1 through 3 can optionally include where the hardware processing circuitry is further configure to: determine a throughput and delay time for the wireless communication device; and determine whether to adapt the channel contention settings based on the determined throughput and delay time for the wireless communication device.

In Example 10, the subject matter of Examples 1 through 9 can optionally include where the wireless communication device is an 802.11ax or DensiFi wireless communication device.

In Example 11, the subject matter of Examples 1 through 10 can optionally include where the hardware processing circuitry is further configure to: determine whether to adapt the channel contention settings based on an application program running on the wireless communication device.

In Example 12, the subject matter of Examples 1 through 11 can optionally include where the hardware processing circuitry is further configured to: operate in at least two different modes, a first mode where the wireless communication device contends for access to a wireless medium and a second mode where the wireless communication device receives an indication of a schedule and accesses the wireless medium based on the schedule.

In Example 13, the subject matter of Examples 1 through 12 can optionally include where the hardware processing circuitry is further configured to: adapt the channel contention settings by selecting a CCA value and at least one other setting from a predetermined table comprising CCA values and at least one other setting.

In Example 14, the subject matter of Examples 1 through 13 can optionally include where the wireless communication device further comprises memory and a transceiver coupled to the processing circuitry.

In Example 15, the subject matter of Example 14 can optionally include where the wireless communication device further comprises one or more antennas coupled to the transceiver.

Example 16 is a method on a wireless communication device for adapting channel contention settings. The method includes determining whether to adapt the channel contention settings; and in response to determining to adapt the channel contention settings, adapting the channel contention settings by changing a level of a clear channel assessment (CCA) and adapting at least one additional channel contention settings.

In Example 17, the subject matter of Example 16 can optionally include where adapting the channel contention settings include raising the level of the CCA and performing at least one from the following group: decreasing a power used to transmit or increasing an amount of time to wait after a CCA determines the channel is free.

In Example 18, the subject matter of Example 17 can optionally include where adapting the channel contention settings include decreasing the level of the CCA and performing at least one from the following group: increasing a power used to transmit or decreasing an amount of time to wait after a CCA determines a channel is free.

Example 19 is an access point comprising hardware processing circuitry configured to: determine a throughput for one or more wireless communication devices; determine whether to adapt the channel contention settings based on the determined throughput; and in response to a determination to adapt the channel contention settings, transmit to at least one of the one or more wireless communication devices a packet indicating the at least one wireless communication device is to adapt its channel contention settings by changing a level of a clear channel assessment (CCA) and by adapting at least one additional channel contention settings.

In Example 20, the subject matter of Example 19 can optionally include where the hardware processing circuitry is further configure to: transmit to at least one of the one or more wireless communication devices the packet indicating the at least one wireless communication device should adapt the channel contention settings by raising a level of the clear channel assessment (CCA) and performing at least one from the following group: decreasing a power used to transmit, raising a back-off time by adding 2 time slots to the back off time, and modifying another portion of a distributed coordination function (DCF).

In Example 21, the subject matter of Example 20 can optionally include where the hardware processing circuitry is further configure to: transmit to at least one of the one or more wireless communication devices the packet indicating the at least one wireless communication device should adapt the channel contention settings by decreasing a level of the clear channel assessment (CCA) and performing at least one from the following group: increasing a power used to transmit or decreasing an amount of time to wait after a CCA determines the channel is free.

In Example 22, the subject matter of Examples 20 or 21 can optionally include where the hardware processing circuitry is further configure to: adapt the at least one additional channel contention setting by adapting the at least one additional channel contention setting to make it more difficult for the wireless communication device to access the channel if the level of the CCA is raised, or make it easier for the wireless communication device to access the channel if the level of the CCA is lowered.

In Example 23, the subject matter of Examples 20 or 21 can optionally include where the hardware processing circuitry is further configure to: transmit to at least one wireless device of the one or more wireless communication devices a packet indicating the at least one wireless communication device should adapt its channel contention settings by changing a level of a clear channel assessment (CCA) and by adapting at least one additional channel contention setting, where each of the at least one wireless device is a 802.11ax wireless device.

In Example 24, the subject matter of Examples 20 through 23 can optionally include where the access point is an 802.11ax or DensiFi access point.

Example 25 is non-transitory computer-readable storage medium that stores instructions for execution by one or more processors to perform operations for adapting channel contention settings, the instructions to configure the one or more processors to: determine whether to adapt channel contention settings; and in response to a determination to adapt the channel contention settings, adapt the channel contention settings to change a level of a clear channel assessment (CCA) and adapt at least one additional channel contention setting.

In Example 26, the subject matter of Examples 25 can optionally include where the instructions are further configured to: adapt the channel contention settings by raising a level of the CCA and perform at least one from the following group: decrease a power used to transmit, raise a back-off time by adding 1 or more time slots to a back off time, and modify another portion of a distributed coordination function (DCF).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication device for adapting channel contention settings, the wireless communication device comprising:
    a memory; and
    hardware processing circuitry coupled to the memory, the hardware processing circuitry configured to:
        determine whether to raise or lower a level of a clear channel assessment (CCA);
        in response to a determination to raise the level of the CCA, raise the level of the CCA and raise at least one additional channel contention setting, wherein raising the at least one additional channel contention setting comprises increasing an amount of time to wait after a CCA determines a channel is free; and
        in response to a determination to lower the level of the CCA, lower the level of the CCA and lower at least one additional channel contention setting, wherein lowering the at least one additional channel contention setting comprises decreasing an amount of time to wait after a CCA determines the channel is free.

2. The wireless communication device of claim 1, wherein the hardware processing circuitry is further configured to:
    raise the level of the CCA only in conjunction with a change to at least one additional channel contention setting that makes it more difficult to contend for the channel, unless the wireless communication device received an indication from a management packet to raise the level of the CCA.

3. The wireless communications device of claim 1, wherein the hardware processing circuitry is further configured to:
    access a wireless medium using the raised or lowered CCA level and the at least one additional raised or lowered channel contention setting; and
    transmit on the wireless medium a packet.

4. The wireless communication device of claim 1, wherein the hardware processing circuitry is further configured to:
    receive a packet indicating the wireless communication device should adapt its channel contention settings to change the level of the CCA and adapt at least one additional channel contention setting; and
    change the level of the CCA and at least one additional channel contention setting according to the received packet.

5. The wireless communication device of claim 1, wherein the hardware processing circuitry is further configure to:
    raise or lower the at least one additional channel contention setting to make it more difficult for the wireless communication device to access the channel if the level of the CCA is raised, or make it easier for the wireless communication device to access the channel if the level of the CCA is lowered.

6. The wireless communication device of claim 1, wherein the hardware processing circuitry is further configure to:
    determine a throughput and delay time for the wireless communication device; and
    determine whether to raise or lower the level of the CCA based on the determined throughput and delay time for the wireless communication device.

7. The wireless communication device of claim 1, wherein the wireless communication device is an 802.11ax or DensiFi wireless communication device.

8. The wireless communication device of claim 1, wherein the hardware processing circuitry is further configure to:
    determine whether to raise or lower the level of the CCA based on an application program running on the wireless communication device.

9. The wireless communication device of claim 1, wherein the hardware processing circuitry is further configured to:

operate in at least two different modes, a first mode where the wireless communication device contends for access to a wireless medium and a second mode where the wireless communication device receives an indication of a schedule and accesses the wireless medium based on the schedule.

10. The wireless communication device of claim 1, wherein the hardware processing circuitry is further configured to:
 raise or lower the level of the CCA to select a CCA value and at least one other setting from a predetermined table comprising CCA values and at least one additional channel contention setting.

11. The wireless communication device of claim 1 further comprising memory and a transceiver coupled to the processing circuitry.

12. The wireless communications device of claim 11 further comprising one or more antennas coupled to the transceiver.

13. A method on a wireless communication device for adapting channel contention settings, the method comprising:
 determining whether to adapt the channel contention settings; and
 in response to determining to adapt the channel contention settings, adapting the channel contention settings by changing a level of a clear channel assessment (CCA) and adapting at least one additional channel contention setting, wherein adapting the at least one additional channel contention setting comprises: raising the level of the CCA and increasing an amount of time to wait after a CCA determines a channel is free, or decreasing the level of the CCA and decreasing an amount of time to wait after a CCA determines the channel is free.

14. An access point for adapting clear channel contention settings, the access point comprising:
 a memory; and
 hardware processing circuitry coupled to the memory, the hardware processing circuitry configured to:
  determine a throughput for one or more wireless communication devices;
  determine whether to adapt the channel contention settings based on the determined throughput; and
  in response to a determination to adapt the channel contention settings, transmit to at least one of the one or more wireless communication devices a packet indicating the at least one wireless communication device is to adapt its channel contention settings, wherein adapting the channel contention settings comprises: raising the level of the CCA and increasing an amount of time to wait after a CCA determines a channel is free, or decreasing the level of the CCA and decreasing an amount of time to wait after the CCA determines a channel is free.

15. The access point of claim 14, wherein the hardware processing circuitry is further configure to:
 transmit to at least one of the one or more wireless communication devices the packet indicating the at least one wireless communication device should adapt the channel contention settings.

16. The access point of claim 14, wherein the hardware processing circuitry is further configure to:
 adapt the at least one additional channel contention setting by adapting the at least one additional channel contention setting to make it more difficult for the wireless communication device to access the channel if the level of the CCA is raised, or make it easier for the wireless communication device to access the channel if the level of the CCA is lowered.

17. The access point of claim 14, wherein the hardware processing circuitry is further configure to:
 transmit to at least one wireless device of the one or more wireless communication devices a packet indicating the at least one wireless communication device should adapt its channel contention settings by changing a level of a clear channel assessment (CCA) and by adapting at least one additional channel contention setting, wherein each of the at least one wireless device is an Institute of Electronical and Electronic Engineers (IEEE) 802.11ax wireless device.

18. The access point of claim 14, wherein the access point is an Institute of Electronical and Electronic Engineers (IEEE) 802.11ax or DensiFi access point.

19. A non-transitory computer-readable storage medium that stores instructions for execution by one or more processors to perform operations for adapting channel contention settings, the instructions to configure the one or more processors to:
 determine whether to raise or lower a clear channel assessment (CCA); and
 in response to a determination to raise the level of the CCA, raise the level of the CCA and raise at least one additional channel contention setting, wherein raising the at least one additional channel contention setting comprises increasing an amount of time to wait after a CCA determines a channel is free; and
 in response to a determination to lower the level of the CCA, lower a level of the CCA and lower at least one additional channel contention setting, wherein lowering the at least one additional channel contention setting comprises decreasing an amount of time to wait after a CCA determines the channel is free.

* * * * *